US008477044B2

(12) United States Patent
Wagner et al.

(10) Patent No.: US 8,477,044 B2
(45) Date of Patent: Jul. 2, 2013

(54) TURN-INDICATOR LIGHT MODULE FOR A VEHICLE MIRROR ASSEMBLY AND VEHICLE MIRROR ASSEMBLY COMPRISING A TURN-INDICATOR LIGHT MODULE

(75) Inventors: Daniel Wagner, Weinstadt (DE); Frank Linsenmaier, Weinstadt (DE)

(73) Assignee: SMR Patents S.a.r.l., Luxembourg (LU)

( * ) Notice: Subject to any disclaimer, the term of this patent is extended or adjusted under 35 U.S.C. 154(b) by 284 days.

(21) Appl. No.: 12/466,106

(22) Filed: May 14, 2009

(65) Prior Publication Data
US 2009/0284365 A1 Nov. 19, 2009

(30) Foreign Application Priority Data

May 16, 2008 (EP) ...................................... 08009048
Apr. 30, 2009 (EP) ...................................... 09006001

(51) Int. Cl.
*G08B 5/00* (2006.01)
(52) U.S. Cl.
USPC ........................................ 340/815.4; 362/494
(58) Field of Classification Search
USPC ................... 340/815.4, 815.42; 362/494, 551, 362/581, 487
See application file for complete search history.

(56) References Cited

U.S. PATENT DOCUMENTS

| | | | |
|---|---|---|---|
| 6,160,948 A | 12/2000 | McGaffigan | |
| 7,049,945 B2 | 5/2006 | Breed et al. | |
| 7,357,542 B2 * | 4/2008 | Waldmann | 362/494 |
| 7,699,511 B2 * | 4/2010 | Kawaji et al. | 362/494 |
| 2004/0218041 A1 * | 11/2004 | Yagi | 348/148 |
| 2005/0117236 A1 * | 6/2005 | Tanaka et al. | 359/876 |
| 2005/0276059 A1 * | 12/2005 | Rodriguez Barros et al. | 362/494 |
| 2007/0290823 A1 * | 12/2007 | Watanabe et al. | 340/435 |

FOREIGN PATENT DOCUMENTS

| | | |
|---|---|---|
| DE | 10218437 | 1/2004 |
| DE | 102006007884 | 8/2007 |
| EP | 1391755 | 2/2004 |
| EP | 1466785 | 10/2004 |

OTHER PUBLICATIONS

European Search Report for application No. EP 08 00 9048 dated Oct. 22, 2008.

* cited by examiner

*Primary Examiner* — George Bugg
*Assistant Examiner* — Edny Labbees
(74) *Attorney, Agent, or Firm* — Reising Ethington PC

(57) ABSTRACT

The invention relates to a turn-indicator light module having an outer contour and comprising one or more light guiding elements and one or more visible-light emitting light sources coupled to at least one of the one or more light guiding elements, wherein at least one infrared light emitting light source is coupled to at least one of the one or more light guiding elements. At least a major portion of a longitudinal extension between a first end and a second end opposite of the first end of the one or more light guiding elements follows the outer contour and wherein the one or more light guiding elements are adapted to emit light at least along the major portion of their longitudinal extension.

10 Claims, 7 Drawing Sheets

TURN-INDICATOR LIGHT MODULE FOR A VEHICLE MIRROR ASSEMBLY AND VEHICLE MIRROR ASSEMBLY COMPRISING A TURN-INDICATOR LIGHT MODULE

FIELD OF THE INVENTION

The invention is based on a priority patent application EP 08009048.3 and EP 09006001.3, which is hereby incorporated by reference.

The invention pertains to a turn-indicator light module for a vehicle mirror assembly and a vehicle mirror assembly comprising turn-indicator light module having an outer contour and comprising one or more light guiding elements and one or more visible-light emitting light sources coupled to at least one of the one or more light guiding elements, wherein at least one infrared light emitting light source is coupled to at least one of the one or more light guiding elements, wherein at least a major portion of a longitudinal extension between a first end and a second end opposite of the first end of the one or more light guiding elements follows the outer contour and wherein the one or more light guiding elements are adapted to emit light at least along the major portion of their longitudinal extension.

BACKGROUND OF THE INVENTION

Modern vehicles are equipped with multiple sensors in order to support the driver and to increase the active and passive safety of the vehicle. For instance, headlamps can be controlled to generate either low beams or high beams. Low beams provide less illumination and are used to illuminate the forward path when other vehicles are present ahead of the ego vehicle. High beams provide more illumination and are used to illuminate the forward path when no other vehicles are present ahead of the ego vehicle. An increasing number of optical functions have to be integrated in a vehicle and in a rear view mirror assembly. The patent U.S. Pat. No. 7,049,945 B2 discloses a vehicular blind spot detection system which employs infrared (IR) light emitting diodes (LED) for illuminating objects to be detected by the blind spot detection system. In EP 1 466 785 A1 a turn indicator assembly is disclosed wherein a light source of the turn indicator and a near-IR LED for night-time illumination are housed in a door mirror assembly. An IR portion of the light emitted by the light source is attenuated in order to avoid dazzling an infrared camera employed for surveying the vehicle's ambient in night-time.

SUMMARY OF THE INVENTION

It is an object of the invention to provide an improved and compact turn-indicator light module for a vehicle mirror assembly which can emit infrared light. Another object of the invention is to provide a vehicle mirror assembly comprising an infrared light emitting turn-indicator light module.

The objects are achieved by the features of the independent claims. The other claims and the description disclose advantageous embodiments of the invention.

According to a first aspect of the invention a turn-indicator light module is proposed. The turn-indicator light module has an outer contour and comprises one or more light guiding elements and one or more visible-light emitting light sources coupled to at least one of the one or more light guiding elements, wherein at least one infrared light emitting light source is coupled to at least one of the one or more light guiding elements. At least a major portion of a longitudinal extension between a first end and a second end opposite of the first end of the one or more light guiding elements follows the outer contour and wherein the one or more light guiding elements are adapted to emit light at least along the major portion of their longitudinal extension.

The IR light can be coupled out along said major portion of the longitudinal extension of said one or more light guiding elements in a homogeneous way or in an inhomogeneous way, for instance at separated spots along the longitudinal extension. The shape of said light guiding elements can have the form of a rod, a fiber, a band, a disk or the like.

Advantageously, it is possible to provide a passive IR illumination for various purposes. The visible-light emitting sources can preferably emit light in the visible wavelength spectrum between blue and red. Favorably, it is possible to integrate an infrared (IR) light source into otherwise conventional turn-indicator light modules. It is of a particular advantage that the turn-indicator light module can be integrated in a mirror assembly of a vehicle and/or coupled to other light units particularly in a vehicle. Expediently, the turn-indicator light module can be adapted to transport IR light in an expedient way. Particularly, one or more light guiding elements can be provided to transport IR light as well as visible light, e.g. by selecting the light guide material to be able to transport visible as well as IR light and/or an arrangement can be provided where at least one light guide for transmitting IR light and at least one light guide for transmitting visible light are provided.

A separate light guiding element can be provided for the one or more infrared light emitting light source of the turn-indicator light module. The one or more light guiding elements can be arranged at appropriate locations for illumination e.g. one or more fields of view of sensors, imaging systems or the like. According to a favorable improvement, the separate light guiding element provided for propagation of infrared light can be arranged in front of a light emitting surface of the one or more light guiding elements provided for one or more visible-light emitting light sources. Alternatively, the separate light guiding element provided for propagation of infrared light can be arranged behind a surface opposite to the light emitting surface of the one or more light guiding elements provided for one or more visible-light emitting light sources. The separate light guiding element provided for propagation of infrared light can be arranged alternately in front of and behind the light emitting surface along the longitudinal extension of the light guiding element provided for propagation of infrared light. Particularly, the separate light guiding element provided for propagation of infrared light can be arranged coplanar to the one or more light guiding elements provided for the propagation of visible light with respect to the light emitting surface of the one or more light guiding element provided for the propagation of visible light.

A compact arrangement is achieved which has desired visible properties, e.g. the flashing light of the turn indicator, as well as additional functions provided by the IR illumination along the one or more light-guiding elements. The normal function of the turn-indicator light module concerning the illumination by the one or more visible-light emitting light sources is not deteriorated.

Additionally or alternatively, one or more infrared light emitting light sources and one or more visible-light emitting light sources are coupled to at least one of the same one or more light guiding elements. This arrangement is very compact and space saving. The normal function of the turn-indicator light module concerning the illumination by the one or more visible-light emitting light sources is not deteriorated.

According to a favorable embodiment, at least one of the one or more light guiding elements to which the one or more infrared light emitting light sources are coupled can be arranged behind a light pane or in front of a light pane, and can particularly be arranged parallel to the light pane. The light pane forms usually the outer surface of the turn-indicator light pane module which covers the turn-indicator light module. As the light pane usually defines the exit surface of light from a light module the orientation of the light pane can indicate into which direction the IR light is emitted from the turn indicator light module.

According to a favorable embodiment, at least one of the one or more light guiding elements to which the one or more infrared light emitting light sources are coupled can pierce through the light pane. The location of said at least one of the one or more light guiding elements can easily be arranged according to a desired design and/or function of said at least one of the one or more light guiding elements.

According to a favorable embodiment, at least one of the one or more light guiding elements to which the one or more infrared light emitting light sources are coupled can be integrated in a light pane. The advantage is a compact arrangement as the said the one or more light guiding elements do not need extra construction space. Further, the orientation of the light pane can indicate into which direction the IR light is emitted from the turn indicator light module.

Advantageously, infrared light can be coupled in at least in one of the one of more guiding elements and the light pane. The coupling of the IR light can be chosen according to requirements of a desired function to be fulfilled by the IR light emission and/or space requirements in the turn-indicator light module.

According to a favorable embodiment, infrared light can be coupled in at least at one end of the one of more light guiding elements and/or along the longitudinal extension of the one or more light guiding elements. Various designs of light guiding elements and turn-indicator light modules can be provided.

According to a favorable embodiment, infrared light can be coupled in at least at one end of the one of more light guiding elements opposite to an end where visible light is coupled in the one or more light guiding elements. Advantageously, IR light can be coupled in into the side of the light guiding element where visible light is coupled out of the light guiding element. Particularly, IR light can be coupled in in a direction opposite to a main direction of motion of a vehicle which comprises the turn light indicator module. A rear vision function with IR light can be achieved.

According to a favorable embodiment, at least one of the one or more light guiding elements to which the one or more infrared light emitting light sources are coupled can be provided with spatially separated structures for coupling out infrared light at spatially distinct locations along the longitudinal extension of said one or more the light guiding elements. The function of spatially separated IR light sources can be simulated.

According to another object of the invention, a mirror assembly is proposed comprising a turn-indicator light module as described above, wherein the turn-indicator light module has an outer contour and comprises one or more light guiding elements and one or more visible-light emitting light sources coupled to at least one of the one or more light guiding elements, and wherein at least one infrared light emitting light source is coupled to at least one of the one or more light guiding elements. At least a major portion of a longitudinal extension between a first end and a second end opposite of the first end of the one or more light guiding elements follows the outer contour and wherein the one or more light guiding elements are adapted to emit light at least along the major portion of their longitudinal extension.

The mirror assembly favorably provides passive IR illumination in a compact and reliable turn-indicator light module. In conventional mirror assemblies, such as exterior or interior rear vision mirror assemblies of a vehicle, it is possible to integrate IR illumination for sensors such as bird-view sensor with a field of vision oriented downwards to the surface the vehicle is located or moving, a blind-spot sensor with a field of vision oriented to the rear side of the vehicle, a pre-crash sensor oriented to a field of vision sideward and/or in front of the vehicle, and the like. Preferably, one or more sensors can be integrated in the mirror assembly which can make use of the IR irradiation provided by the turn-indicator light module. However, the sensor and the turn-indicator light module can also be mounted in separate locations at a vehicle, thus allowing for a variability of an adequate design of a sensor/illumination arrangement.

Favorably, at least one of the light guiding elements coupled to the one or more infrared light emitting light source can provided for illuminating a field of vision with infrared light.

According to a preferred embodiment, the infrared light emitting source can be coupled to an imaging system and/or a detector system. A night time vision can be considerably improved.

A separate light guiding element can be provided for the one or more infrared light emitting light source. The separate light guide can be particularly adapted for the transmission of IR light.

A particular space-saving arrangement is possible if the separate light guiding element provided for propagation of infrared light can be arranged in front of a light emitting surface of the one or more light guiding element provided for one or more visible-light emitting light sources and/or behind a surface opposite to the light emitting surface of the one or more light guiding element provided for one or more visible-light emitting light sources.

BRIEF DESCRIPTION OF THE DRAWINGS

The present invention together with the above-mentioned and other objects and advantages may best be understood from the following detailed description of the embodiments, but not restricted to the embodiments, wherein is shown schematically.

DETAILED DESCRIPTION OF EXAMPLE EMBODIMENTS

Figure 1A:
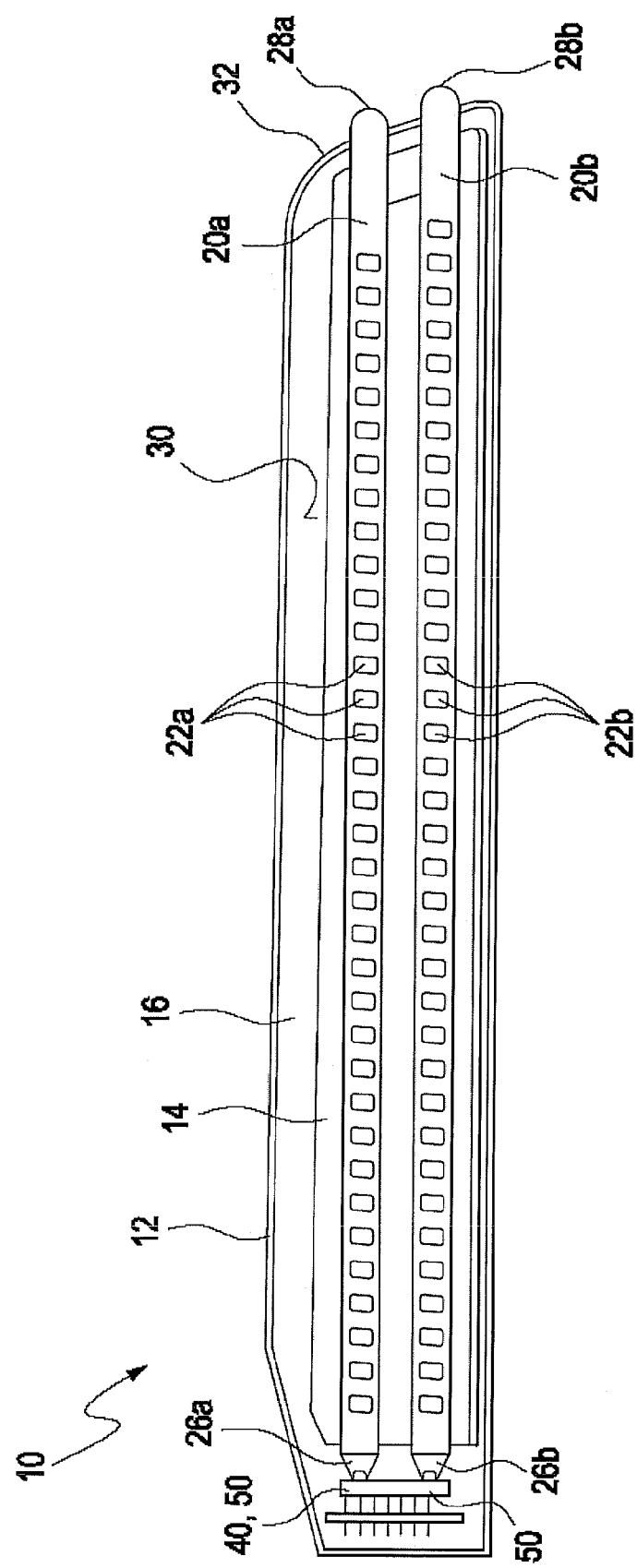
FIG. 1a, 1b a front view (FIG. 1a) of a first embodiment of a preferred turn-indicator light module and a longitudinal cut through the preferred turn-indicator light module (FIG. 1b) according to the invention.

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

Figure 1B:
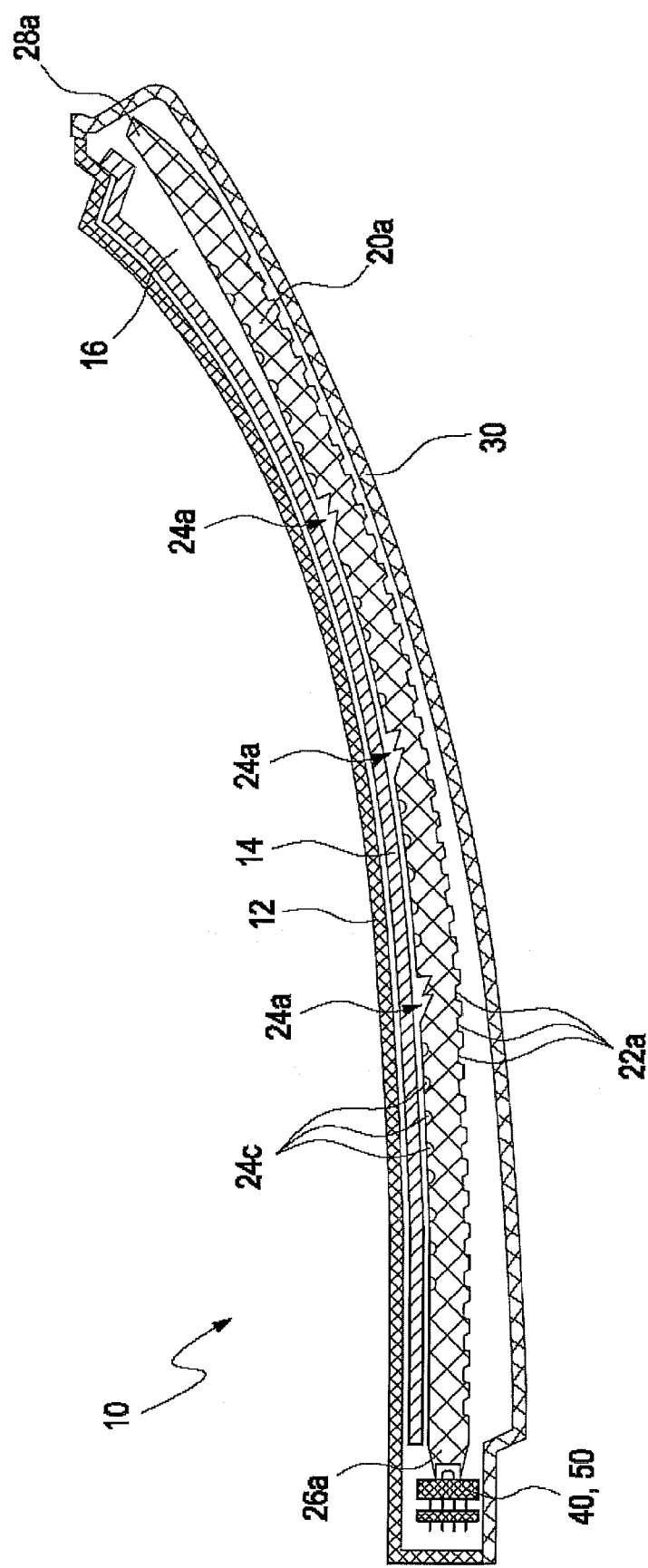

FIGS. 1a and 1b depict an example embodiment of a preferred turn-indicator light module 10 of a preferred rear view mirror assembly as disclosed in a U.S. patent application having a publication number 2006/193,144, the disclosure of which is hereby included by reference in its entirety.

The turn-indicator light module disclosed in U.S. patent application having a publication number 2006/193,144, has two parallel light guiding elements embodied as optical fibers including a set of deflecting structures, which deflect light that falls on the structures in such a manner that the light comes out of a front side of the optical fiber along the longitudinal extension. A set of optically operative structures is arranged over a length of the optical fiber and a part of the resigning light is emitted in angular areas extending transverse to a driving direction (main direction of motion) of the vehicle comprising the turn-indicator light module.

According to the invention an IR light source 40 is implemented in the turn-indicator light module 10. FIG. 1a shows a front view of the preferred turn-indicator light module 10 comprising two coplanar light guiding elements 20a, 20b and FIG. 1b is a longitudinal cut through the upper light guide 20a. Visible and IR light can exit light emitting surfaces 38a, 38b of the light guiding elements 20a, 20b, i.e. the front side of the light guiding elements 20a, 20b. The light emitting surfaces 38a, 38b are comprised by a major portion of the longitudinal extensions 18a, 18b of the light guiding elements 20a, 20b. The light guiding elements 20a, 20b are formed in a way to follow smoothly the contour of the turn-light indicator module 10.

Each of the light guiding elements 20a, 20b is coupled to a visible-light emitting light source 50, such as e.g. a LED. The visible-light emitting light source 50 can also be a bulb or the like. The IR light and the visible light is coupled in the light guiding elements 20a, 20b at one end of the light guiding elements 20a, 20b.

The surfaces of the light guiding elements 20a, 20b show structures 22a, 22b (at the front side) and light deflecting structures 24a, 24c at the rear side which allows light which is emitted by the visible-light emitting light source 50 at a first front end 26a, 26b towards a second front end 28a, 28b of the light guiding elements 20a, 20b to exit the light guiding elements 20a, 20b at spatially separate locations at the front side of the light guiding elements 20a, 20b defined by the structures 22a, 22b, 24a, 24c, as generally described in U.S. patent application having a publication number 2006/193, 144.

The light guiding elements 20a, 20b are arranged in the interior 16 of a housing 12. The light guiding elements 20a, 20b are arranged in front of a reflector 14 which reflects light exiting on the rear side of the light guiding elements 20a, 20b towards the front side of the turn-indicator light module 10 which is closed by a light pane 30.

The upper light guide 20a is coupled to an IR light emitting source 40 additionally to the visible light emitting light source 50. IR light can exit the light guiding element 20a at its front and rear side together with visible light without interfering with the turn-indicator light module's function in the visible range. Additionally, if the visible-light emitting light source 50 is not active, the IR light emitting light source 40 can emit IR light in a field of vision corresponding to the field of vision covered by the visible light. The turn-indicator light module 10 can be integrated into a vehicle mirror assembly, particularly a rear view mirror assembly.

Figure 2A:
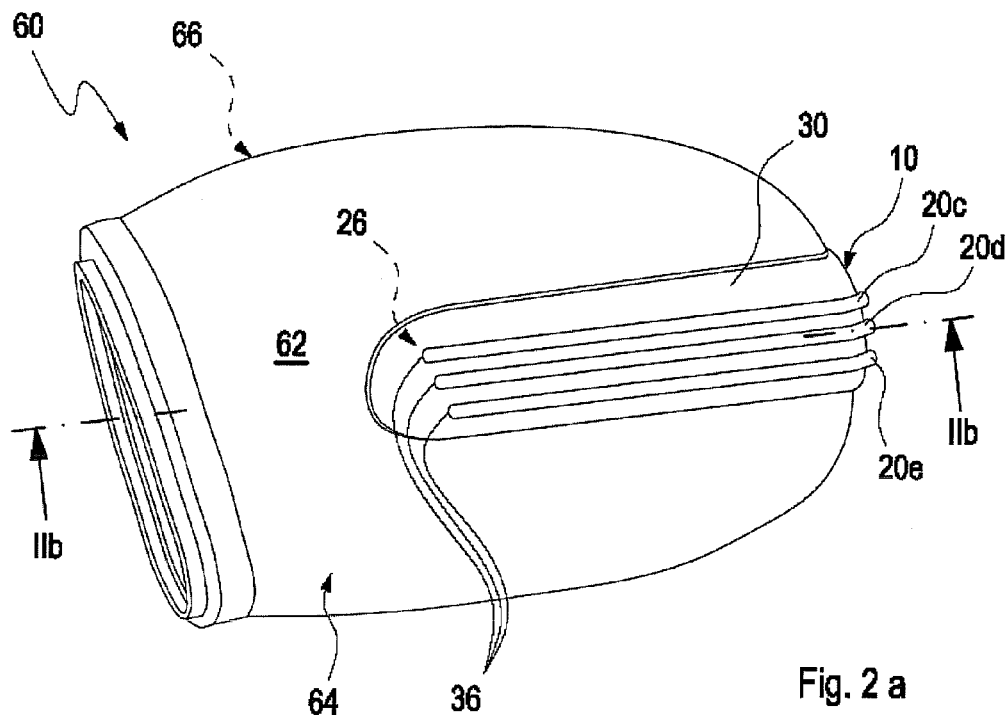
FIG. 2a, 2b a front view of a preferred mirror assembly (FIG. 2a) according to the invention comprising a second preferred embodiment of a turn-indicator light module and a longitudinal cut through the preferred mirror assembly (FIG. 2b)
Figure 2B:
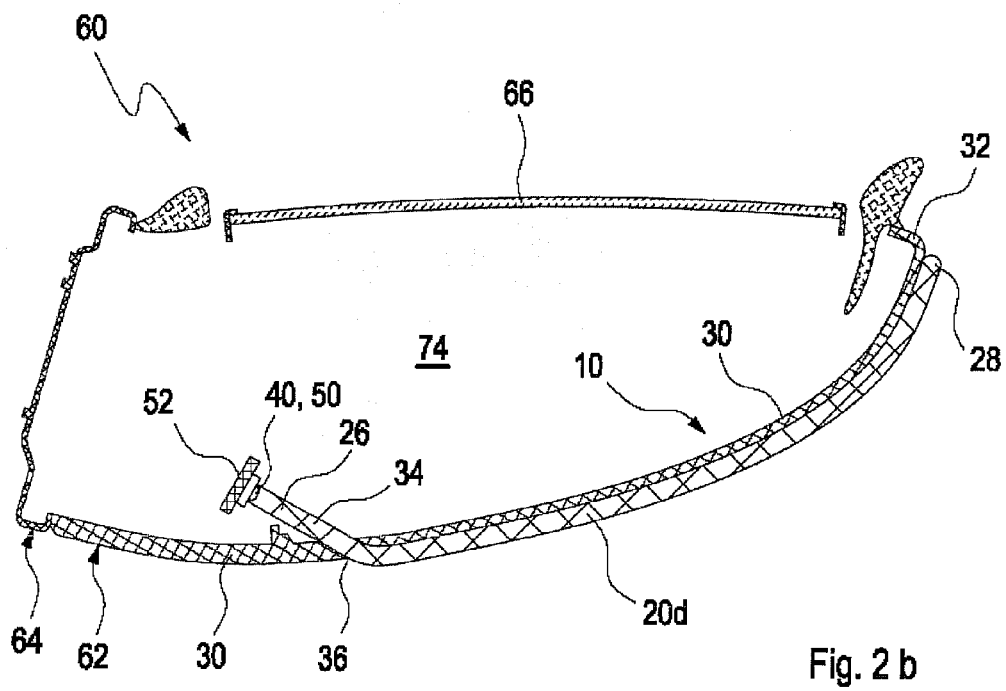

FIGS. 2a and 2b depict another example embodiment of a preferred turn-indicator light module 10 of a preferred rear view mirror assembly as disclosed in U.S. Pat. No. 7,357,542, the disclosure of which is hereby included by reference in its entirety.

U.S. Pat. No. 7,357,542, describes an outside rear-view mirror having a mirror head and a housing comprising a recess for a flashing turn-light indicator provided with a light pane and light-guiding elements embodied as optical cable into which light may be coupled by at least one lighting means. In order to configure the outside rear-view mirror in such a way that an optimal lighting function is achieved with a constructional simple, cost-effective configuration, the optical cable extends on the outside of the light pane and protrudes into the housing through the light pane, so the light coupling point is located inside the housing. The corresponding lighting means may therefore not be seen from the outside. The outside rear-view mirror is particularly suitable for motor vehicles. The optical cable allows the statutory requirements with respect to light values when indicating to be met and a uniform illumination to be achieved.

According to the invention, an IR light source 40 is implemented in the turn-indicator light module 10. FIG. 2a shows a front view of the side of an exterior rear view mirror assembly 60 opposite to a mirror 66 covering an internal space 74 of a mirror housing 64. The turn-indicator light module 10, which is a turn indicator, is integrated in the rear view mirror assembly 60. FIG. 2b exhibits a longitudinal cut through the mirror housing 64 of the mirror head 62 and the turn-indicator light module 10.

The IR light and the visible light is coupled in the light guiding elements 20c, 20d, 20e at one end 26 of the light guiding elements 20c, 20d, 20e. The light sources 40, 50 are located inside the rear view mirror assemble 60 and is hidden from the view from the outside. The light guiding elements 20c, 20d, 20e are formed in a way to follow smoothly the contour of the turn-light indicator module 10 and the contour of the mirror housing 64.

As already described in U.S. Pat. No. 7,357,542, a light pane 30 exhibits light guiding elements 20c, 20d, 20e which are arranged on an outer surface of the light pane 30. The front ends 34 of the light guiding elements 20c, 20d, 20e are located inside the mirror housing 64, pierce through the light pane 30 at points 36 and end at the distal end 28 adjacent to a distal end 32 of the light pane 30. IR light and visible light can exit the light guiding elements 20c, 20d, 20e all along their longitudinal extensions 18c, 18e, 18d between first ends 26 and second ends 28 on the front sides of the light guiding elements 20c, 20d, 20e, the front sides forming light emitting surfaces 38c, 38d, 38e of the turn-indicator light module 10.

At the front ends 34 of the light guiding elements 20c, 20d, 20e, visible-light emitting light sources 50 are arranged. By way of example, the visible-light emitting light sources 50 are SMD-LEDs (SMD=surface mounted device) which are mounted on boards 52. Additionally to the visible-light emitting light source 50 of the light guiding element 20d an IR light emitting source 40 is coupled to the light guiding element 20d. It is possible to couple an IR emitting light source 40 to more than one of the light guiding elements 20c, 20d, 20e. As in the example embodiment of FIGS. 1a and 1b, IR light can exit the light guiding element 20d at its front side together with visible light without interfering with the turn-indicator light module's function in the visible range. Additionally, if the visible-light emitting light source 50 is not active, the IR light emitting light source 40 can emit IR light.

Figure 3:
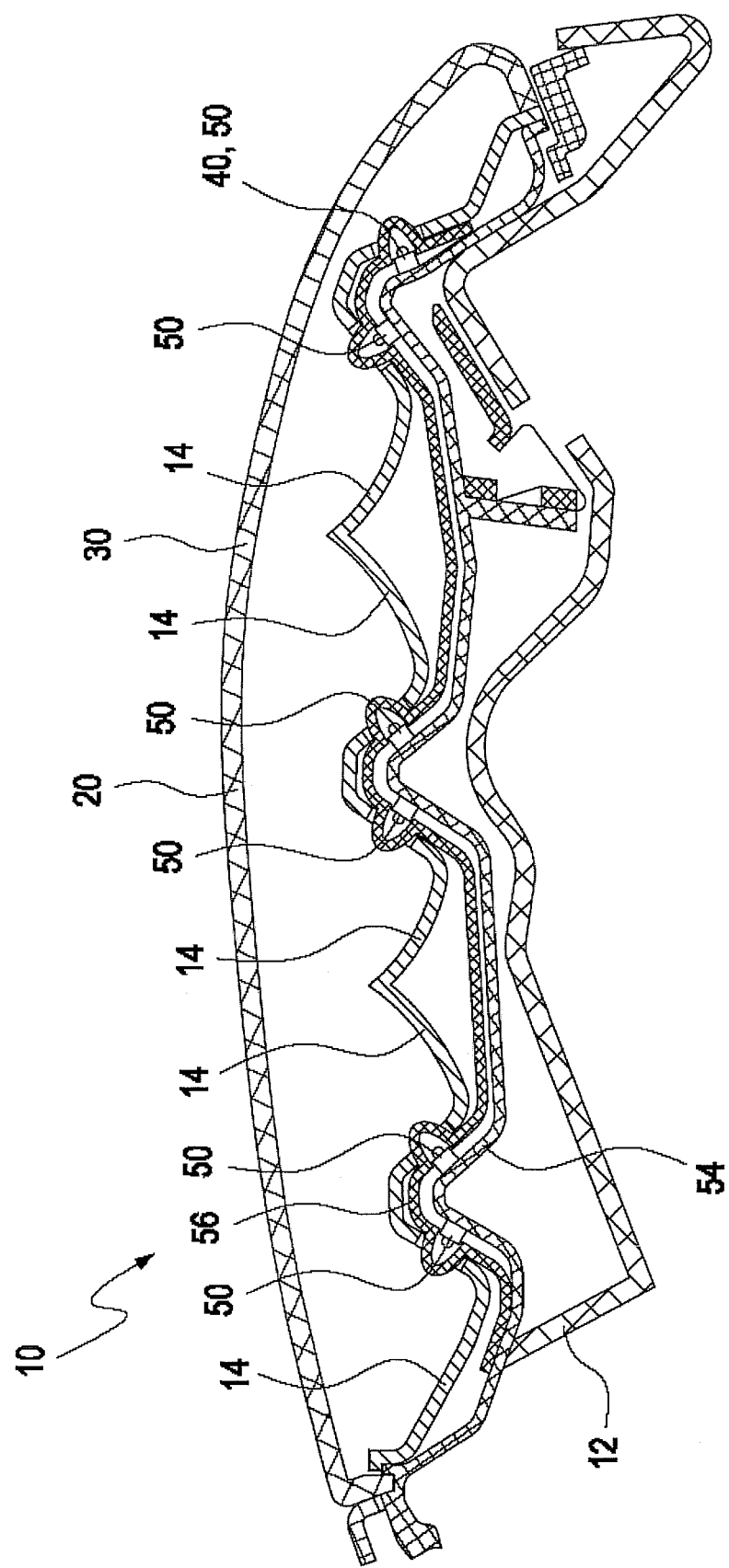
FIG. 3 a longitudinal cut through a third preferred embodiment of a turn-indicator light module according to the invention.

FIG. 3 depicts a partial longitudinal cut through a detail of a preferred rear view mirror assembly as disclosed in U.S. Pat. No. 6,695,465, the disclosure of which is hereby included by reference in its entirety.

An exterior rearview mirror for vehicles is disclosed by U.S. Pat. No. 6,695,465, which has a mirror head housing having a light-transmitting light plate arranged therein. At least one lighting unit is received in the mirror head housing and has at least one light source emitting light rays so as to pass through the light-transmitting light pane to the exterior of the mirror head housing. At least one reflector is positioned between the at least one light source and the light-transmitting light plate. The at least one reflector has at least one opening, and the at least one light source is positioned in the at least one opening. The at least one lighting unit has a lighting unit housing and the at least one light source is arranged in the lighting unit housing which is received in a receptacle of the mirror head housing.

In the turn-indicator light module 10 according to the invention, which is comprised by such exterior rearview mirror, one or more IR light sources 40 are implemented in the turn-indicator light module 10 additional to a multitude of visible-light emitting light sources 50 such as LEDs which are arranged in reflectors 14. IR light and visible light can exit the light guiding element 20 all along its longitudinal extensions 18 between a first end 26 and a second end 28 on the front sides of the light guiding elements 20, the front side forming light emitting surfaces 38 of the turn-indicator light module 10. The light guiding element 20 forms the light pane 30 of the turn-indicator light module 10.

The IR and the visible light is coupled in the light guiding element 20 along its longitudinal extension 18. The light guiding element 20 is formed in a way to follow smoothly the contour of the turn-light indicator module 10.

Visible-light emitting light sources 50 are located in the vertex of each of several paraboloidally shaped reflectors 14. The reflectors 14 are covered by a light pane 30. Electrical connections are provided by a foil 54 which connects the LEDs of the turn-indicator light module 10 with a power supply (not shown). Between the foil 54 and the reflectors 14 a protecting cover 56 is arranged which protects the foil 54 against moisture, dirt and the like. The light pane 30 is preferably embodied as a light guiding element 20. The IR light source 40 can be arranged at one of the locations of the visible-light emitting light sources 50 or as indicated close to one end of the light pane 30.

Figure 4:
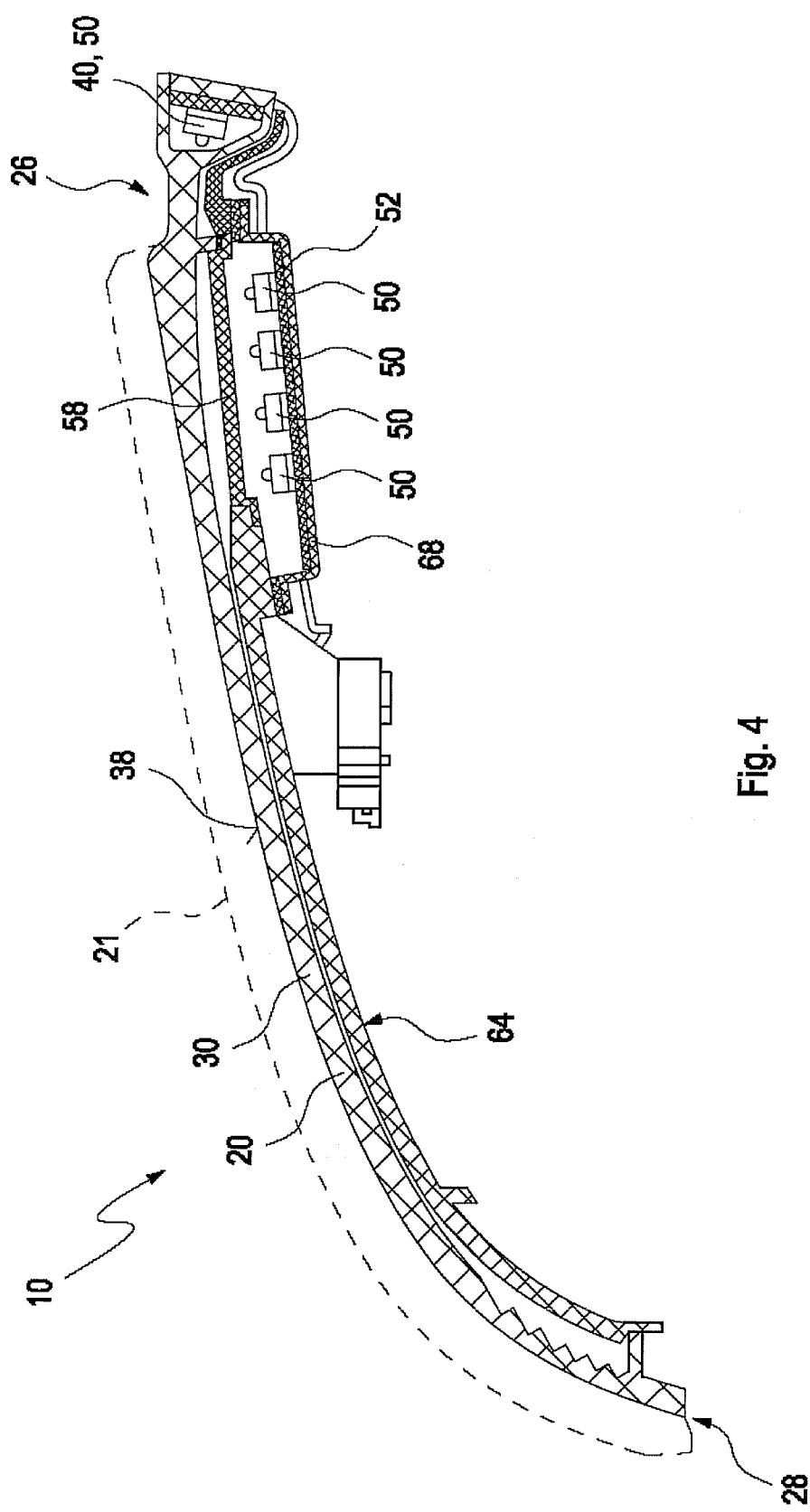
FIG. 4 a longitudinal cut through a fourth preferred embodiment of a turn-indicator light module according to the invention.

FIG. 4 depicts a partial longitudinal cut through a preferred rear view mirror assembly comprising a preferred turn-indicator light module 10 as a turn indicator as disclosed in U.S. Pat. No. 6,139,171, the disclosure of which is hereby included by reference in its entirety. According to the invention one or more IR light sources 40 are implemented in the turn-indicator light module 10.

The rear view mirror disclosed in U.S. Pat. No. 6,139,171, has an LED as visible light source protruding partially from the opening of the covering section. Several LEDs are arranged on the end surface of the opening, facing away from the car, over the length and/or breadth of the light transmitting light pane. The LEDs are arranged behind a Fresnel lens. The Fresnel lens is located in the area between the cover section and the light window. The lens is connected with the covering section. The LEDs are located in a housing, connected to the cover section. The housing is located on the side of the cover section turned away from the light window. Alternatively a U-shaped fluorescent tube can be used as the visible light source.

According to this example embodiment of the invention, a separate light guiding element 21 is provided for the one or more IR light emitting light sources 40, which overlays a light emitting surface 38 of a light pane 30 provided for a multitude of visible-light emitting light sources 50 positioned in a housing 68 beneath a Fresnel optic element 58. The Fresnel optic element 58 is placed in a cut-out of a mirror housing 64 and allows the emission of visible light through the light pane 30 more or less perpendicular to its longitudinal extension. The separate IR light guiding element 21 is extending from a first end 26 to a second end 28 with its longitudinal extension 18. IR light can exit the separate light guiding element 21 along its longitudinal extension 18 through its light emitting surface parallel to the light emitting surface 38 of the visible light. The IR light source 40 is located at the first end 26 of the light guiding element 20, coupled in the light guiding element 20 and transmitted to the separate light guiding element 21. The light guiding element 20 is formed in a way to follow smoothly the contour of the turn-light indicator module 10.

The light pane 30 can be embodied as a light guiding element 20. An additional visible-light emitting light source 50 is placed at one end of the light pane 30 the light of which is transmitted towards the opposite end 28 of the light pane 30

Additional to this visible-light emitting light source 50 an IR emitting light source 40 can be placed, the IR light of which can be coupled preferably into the light guiding element 21.

Figure 5:
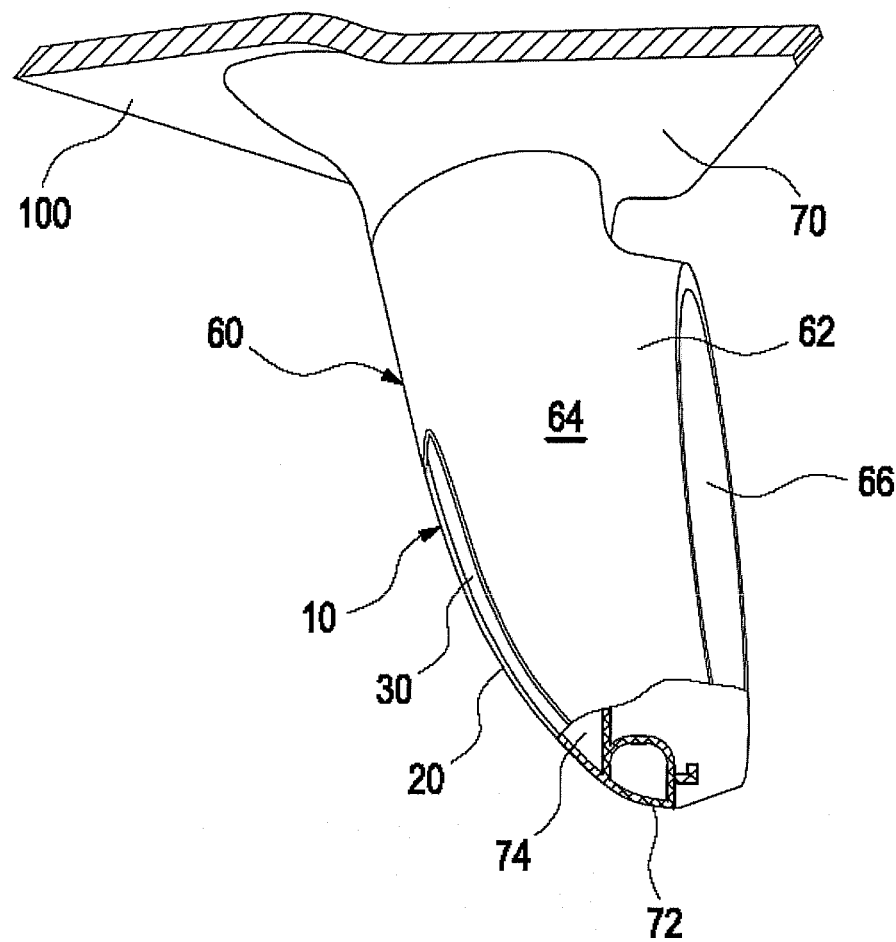
FIG. 5 a top view of a preferred mirror assembly according to the invention.

FIG. 5 depicts a preferred rear view mirror assembly 60 equipped with a preferred turn-indicator light module 10 as disclosed in U.S. Pat. No. 6,280,068, the disclosure of which is hereby included by reference in its entirety. The mirror assembly 60 is attached to a vehicle body with a mirror foot 70. According to the invention, one or more IR light sources 40 are implemented in the turn-indicator light module 10 in the mirror head 62 of the mirror assembly 60. A light pane 30 which is embodied as light guiding element 20 forms a cover of the turn-indicator light module 10.

The external rear view mirror according to U.S. Pat. No. 6,280,068, has a mirror foot and a mirror head, which has a mirror glass carrier, and in which at least one turn-light indicator module is accommodated, which lies behind a light transmitting light pane. The turn-light indicator module is arranged in the mirror head in a way that it emits light in the main direction of motion of the vehicle rearwards at an angle of at least 55 degrees with reference to a straight line running outside the contour of the mirror head, lying parallel to the vehicle axis. The angle range may be least 60 degrees. The turn-light indicator module is located in the front of an ellipsoidal reflector, in a focal point of the reflector. In another focal point, the light beams reflected by the reflector intersect each other.

According to this example embodiment of the invention, at one end 72 of the mirror's housing 64 a visible-light emitting light source 50 can be placed which illuminates the end 72. In an inner space of the mirror assembly 60 one or more visible-light emitting light sources 50 can be arranged. An IR emitting light source 40 can be placed at the end 72 and/or inside the housing 64. The light emitted by the IR emitting light source 40 can be coupled into the light guiding element 20 and illuminate the ambient of the vehicle. The light guiding element 20 has a longitudinal extension 18 which follows smoothly the contour of the turn-indicator light module 10 and the mirror housing 64.

Figure 6:
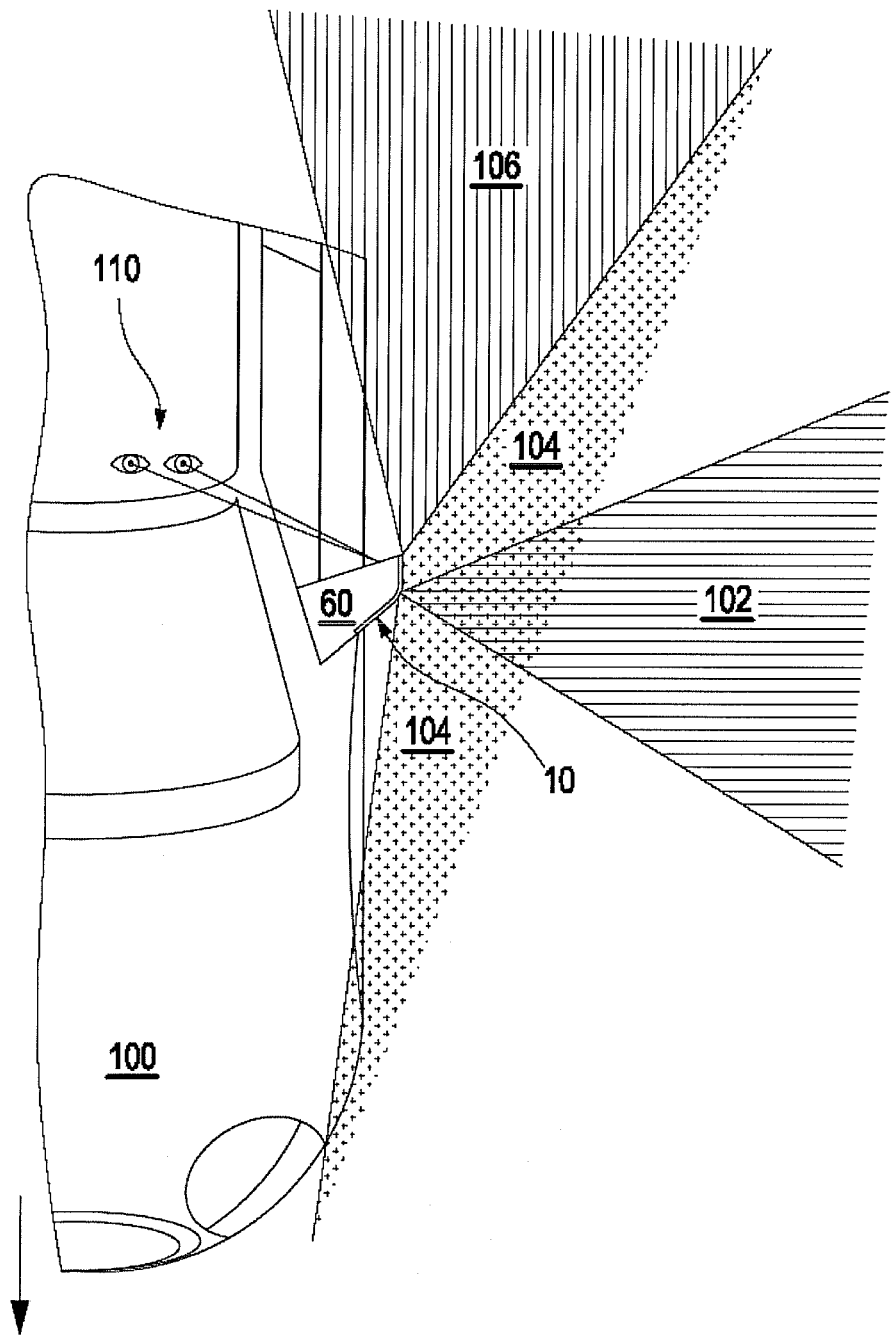
FIG. 6 a representation of different fields of view illuminated by an infrared light source in a preferred external rear view mirror assembly according to the invention.

By implementing one or more IR emitting light sources 40 in the turn-indicator light modules 10 of the various embodiments shown in the FIGS. 1-5, it is possible to illuminate fields of view 102, 104, 106 of a vehicle 100 which are illuminated by the visible-light emitting light sources 50 of the turn-indicator light module 10 and the mirror assembly 60 in which the turn-indicator light module 10 is incorporated. This is shown in FIG. 6 by way of example of a rear view mirror assembly 60. A driver 110 in a normal seating position, indicated by a pair of eyes, can use the rear vision mirror assembly 60 in its conventional way while the turn-indicator light module 10 allows for illuminating various areas with visible light and/or IR light for various sensors such as e.g. a pre-crash sensor using a field of vision 102, a bird-view sensor using the field of vision 104 and/or a blind-spot-detection sensor making use of the field of vision 106.

The invention claimed is:

1. A turn-indicator light module fixedly securable to an exterior rear view mirror of a motor vehicle wherein the exterior rear view mirror defines a forward facing contour, said turn-indicator light module comprising:
   a single light guiding element defining a longitudinal extension and an outer contour, wherein said outer contour complementing the forward facing contour of the exterior rear view mirror;
   a visible-light emitting source coupled to said single light guiding element such that visible light emitted by said visible-light emitting source is radiated out from said single light guiding element along all of said outer contour; and
   an infrared light emitting source coupled to said single light guiding element such that infrared light emitted by said infrared light emitting source is radiated out from said single light guiding element along all of said outer contour in conjunction with and independently from the visible light being emitted by said visible-light emitting source, wherein the visible light and the infrared light are transmitted through said single light guiding element along said longitudinal extension thereof and are radiated out therefrom independently of each other.

2. The turn-indicator light module according to claim 1, wherein said infrared light emitting source and said visible-light emitting source are coupled to said single light guiding element.

3. The turn-indicator light module according to claim 1, wherein said single light guiding element to which said infrared light emitting source is coupled is arranged behind a light pane or in front of said light pane, and particularly arranged parallel to said light pane.

4. The turn-indicator light module according to claim 1, wherein said single light guiding element pierces through a light pane.

5. The turn-indicator light module according to claim 1, wherein said single light guiding element is integrated in a light pane.

6. The turn-indicator light module according to claim 3, wherein infrared light is coupled in said single light guiding element and said light pane.

7. The turn-indicator light module according to claim 1, wherein infrared light is coupled in an end of said single light guiding element.

8. The turn-indicator light module according to claim 1, wherein infrared light is coupled in at one end of said single light guiding element and visible light is coupled in said single light guiding element at a second end opposite said one end.

9. The turn-indicator light module according to claim 1, wherein said single light guiding element includes spatially separated structures for coupling out the visible light and the infrared light at spatially distinct locations along said single light guiding element.

10. The turn-indicator light module according to claim 9, wherein said single light guiding element includes light deflecting structures at a rear side thereof for deflecting visible light toward said plurality of spatially separated structures.

* * * * *